United States Patent [19]

McDermott

[11] Patent Number: 5,090,546
[45] Date of Patent: Feb. 25, 1992

[54] DOOR/LEDGE ASSEMBLY FOR GRAVITY CHUTE

[75] Inventor: Daniel R. McDermott, Clinton, Md.

[73] Assignee: Trihard, S.A., Luxembourg

[21] Appl. No.: 411,218

[22] Filed: Sep. 22, 1989

Related U.S. Application Data

[63] Continuation of Ser. No. 280,914, Dec. 7, 1988, abandoned.

[51] Int. Cl.$^5$ .............................................. B65G 11/16
[52] U.S. Cl. ............................... 193/34; 220/334; 232/44; 49/67
[58] Field of Search ............... 193/2 R, 2 A, 8, 30, 193/33, 34; 220/334, 335; 209/375; 232/43.1, 44; 49/61, 67

[56] References Cited

U.S. PATENT DOCUMENTS

| | | | |
|---|---|---|---|
| 503,685 | 8/1893 | Ryder | 193/34 |
| 892,550 | 7/1908 | Ream | 193/2 R |
| 951,602 | 3/1910 | Edwards | 193/34 |
| 1,001,713 | 8/1911 | Wallace | 193/34 |
| 1,146,127 | 7/1915 | Bruhn | 193/34 |
| 1,169,319 | 1/1916 | Dargin | 193/34 |
| 1,193,058 | 8/1916 | Raber | 193/34 |
| 1,220,718 | 3/1917 | Bibb | 193/34 |
| 1,510,288 | 9/1924 | Malone | 193/34 |
| 1,530,787 | 3/1925 | Oberst | 193/34 |
| 1,536,642 | 5/1925 | Wall | 193/34 |
| 1,672,199 | 6/1928 | Brown | 193/34 |
| 1,707,011 | 3/1929 | Heybeck | 193/34 |
| 1,739,539 | 12/1929 | Wilkinson | 193/34 |
| 1,789,123 | 1/1931 | Triggs | 193/33 |
| 1,820,262 | 8/1931 | Wilkinson | 193/34 |
| 1,877,234 | 9/1932 | Gallagher | 193/34 |
| 1,968,007 | 7/1934 | Willey | 193/34 |
| 3,095,073 | 6/1963 | Larson et al. | 193/33 |
| 3,627,090 | 12/1971 | Dickey | 193/34 |
| 4,066,158 | 1/1978 | Hare et al. | 193/34 |
| 4,278,163 | 7/1981 | Tomich | 193/34 |
| 4,339,024 | 7/1982 | Wollin | 193/34 |
| 4,603,769 | 8/1986 | Bach et al. | 193/12 |
| 4,640,403 | 2/1987 | McDermott | 193/34 |

FOREIGN PATENT DOCUMENTS

| | | | |
|---|---|---|---|
| 527991 | 12/1920 | France | 193/34 |
| 296482 | 3/1932 | Italy | 193/34 |
| 818995 | 4/1981 | U.S.S.R. | |
| 976673 | 12/1964 | United Kingdom | 193/33 |

Primary Examiner—Robert P. Olszewski
Assistant Examiner—Cheryl L. Gastineau
Attorney, Agent, or Firm—Griffin Branigan & Butler

[57] ABSTRACT

A gravity conveyor chute section (10) includes a door/ledge assembly (20), having a ledge (30) which is hingedly attached to a sidewall (12) of the chute section below a side opening (16) into the chute section and first and second side supports (56, 58), which extend from side edges (32, 34) of the ledge to the chute sidewall beyond side edges (36, 38) of a front panel (18). The ledge can be moved to a laterally-extending position for forming a ledge below the side opening and to a closed position for closing the side opening. When the ledge is moved to the closed position, the side supports move along side panels (22, 24) of the sidewall beyond the first and second side edges of the front panel. A door (68) is hingedly mounted on the ledge for being selectively rotated to the laterally-extending position with the ledge and to a closed position with or without the ledge.

9 Claims, 2 Drawing Sheets

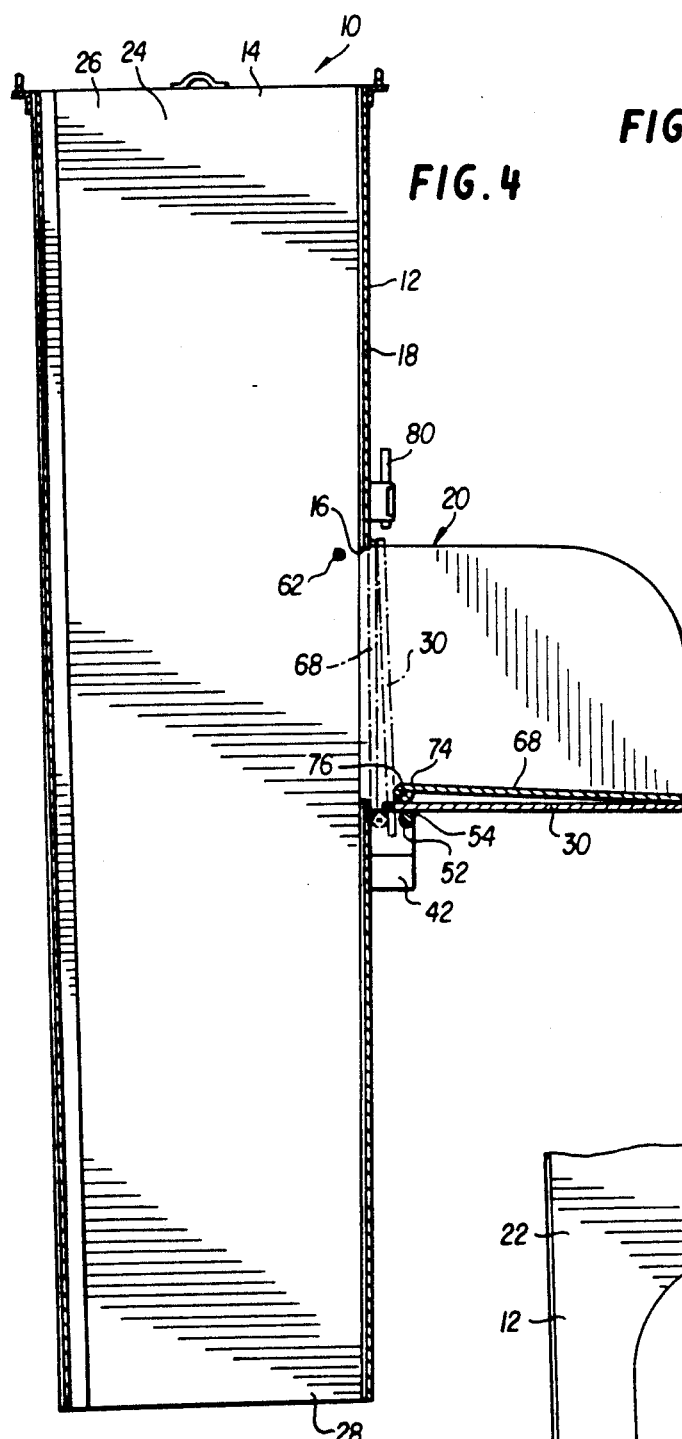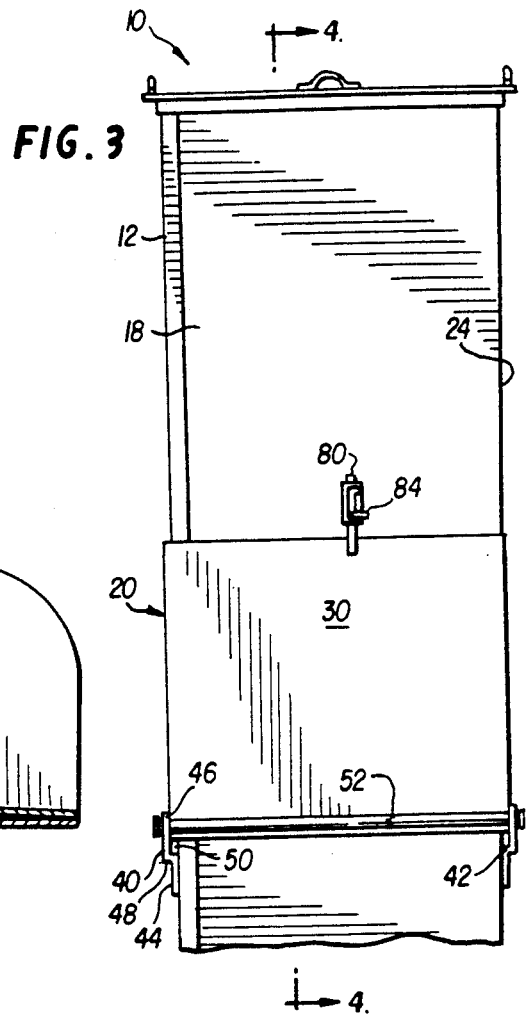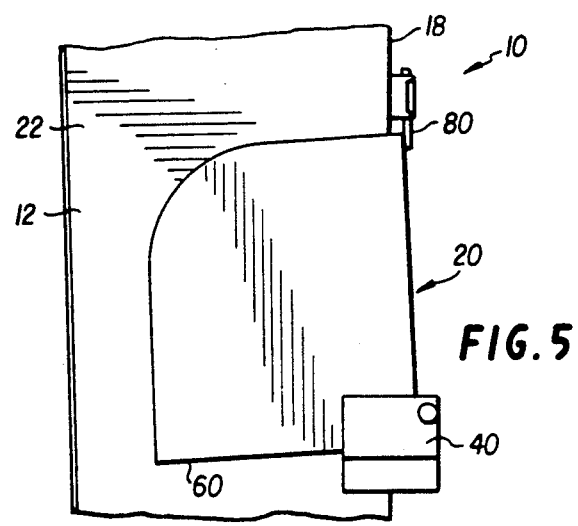

DOOR/LEDGE ASSEMBLY FOR GRAVITY CHUTE

This is a continuation of application Ser. No. 07/280,914, filed Dec. 7, 1988, now abandoned.

BACKGROUND OF THE INVENTION

This invention relates generally to the art of gravity conveyors, or chutes, which are often used for dropping trash from tall construction sites, such as buildings in a controlled manner.

U.S. Pat. No. 4,640,403 to McDermott describes a gravity-conveyor chute section having a side opening in a side panel thereof with a rotatable door/ledge assembly mounted thereat. The door/ledge assembly includes a ledge which can be moved between a closed position, flat against the side panel of the chute section, and a laterally-extending position in which it forms a ledge below the side opening. The door/ledge assembly of the McDermott patent also includes a frame having a door mounted thereon so that when the ledge is in the laterally-extending position the door can be opened and closed for controlling use of the side opening. Although the McDermott device of U.S. Pat. 4,640,403 has many advantages over prior-art systems, it has the disadvantage that when the ledge is moved to the closed position, flat against the side panel, the frame and the door are rotated into a bore of the chute section so that trash can no longer properly pass through the bore. However, in some cases, it is desirable for trash to pass through the bore while the ledge is in the closed position. Thus, it is an object of this invention to provide a door/ledge assembly for a gravity chute section which can be moved to a closed position without obstructing the bore of the section.

It is a further object of this invention to provide a gravity conveyor chute section having a rotatable ledge but also including a lockable door which can be used for controlling use of a side opening when the ledge is in a laterally-extending position.

It is yet another object of this invention to provide a gravity chute section having a rotatable door/ledge assembly which when the door/ledge assembly is in a closed position is relatively streamlined so that the chute sections can be easily stored and transported without having unduly protruding members.

SUMMARY

According to principles of this invention, a door/ledge assembly for a gravity conveyor chute section has a ledge which is wider than a front panel at which the door/ledge assembly is mounted and first and second side supports extend from side edges of the ledge to left and right side panels of the section. When the door/gravity assembly is moved to a closed position the first and second side supports slide along the left and right side panels. A door is hingedly attached to the ledge so that it can be rotated vertically between a laterally-extending position with the ledge in a closed position covering the side opening with or without the ledge.

A lock is mounted above the side opening for locking both the ledge and door together covering the opening or for only locking the door covering the opening.

BRIEF DESCRIPTION OF THE DRAWINGS

FIG. 3 is a front fragmented view similar to the FIG. 2 view, however, in FIG. 3 a door/ledge assembly is in a closed position whereas in FIG. 2 it is in an open position;

FIG. 4 is a sectional view taken on line 4—4 in FIG. 3 but with the door/ledge assembly being in an open position;

FIG. 5 is a fragmented side view of the gravity conveyor chute section of the other drawings with the door/ledge assembly being in a closed position.

DESCRIPTION OF THE PREFERRED EMBODIMENT

Figure 1:
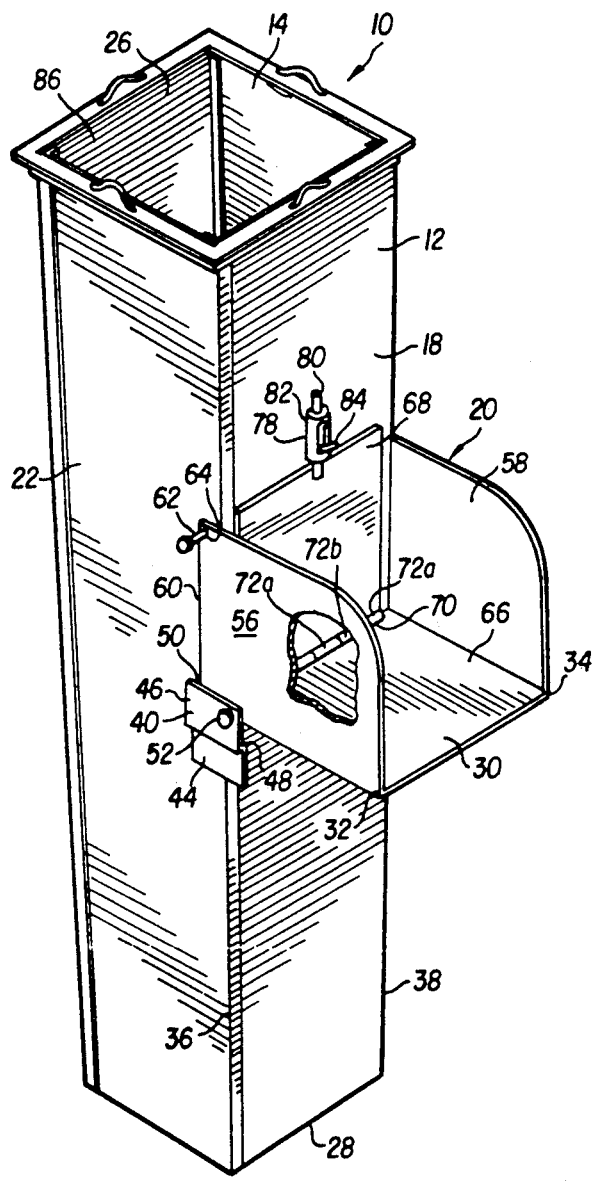
FIG. 1 is an isometric view of a gravity conveyor chute section of this invention.

Referring now to the drawings, a gravity conveyor chute section 10 comprises a tubular sidewall 12 defining a bore 14 and a side opening 16 in a front panel 18 thereof and a door/ledge assembly 20.

The sidewall 12 is rectangular in cross-sectional shape and, in addition to the front panel 18 has left and right side panels 22 and 24. The bore 14 defines an upstream end opening 26 and a downstream end opening 28. It should be understood that ends of the gravity conveyor chute section 10 are to be telescoped with ends of other gravity conveyor chute sections so as to form a long gravity conveyor chute with each section serially receiving and further conveying materials deposited in the chute.

Looking now at the door/ledge assembly 20, this assembly comprises an approximately rectangularly-shaped ledge 30 which is hingedly mounted to the sidewall 12 below the side opening 16. It should be noted that the ledge 30 is wider than the front panel 18 so that first and second side edges 32 and 34 thereof extend beyond first and second side edges 36 and 38 of the front panel 18.

Figure 2:
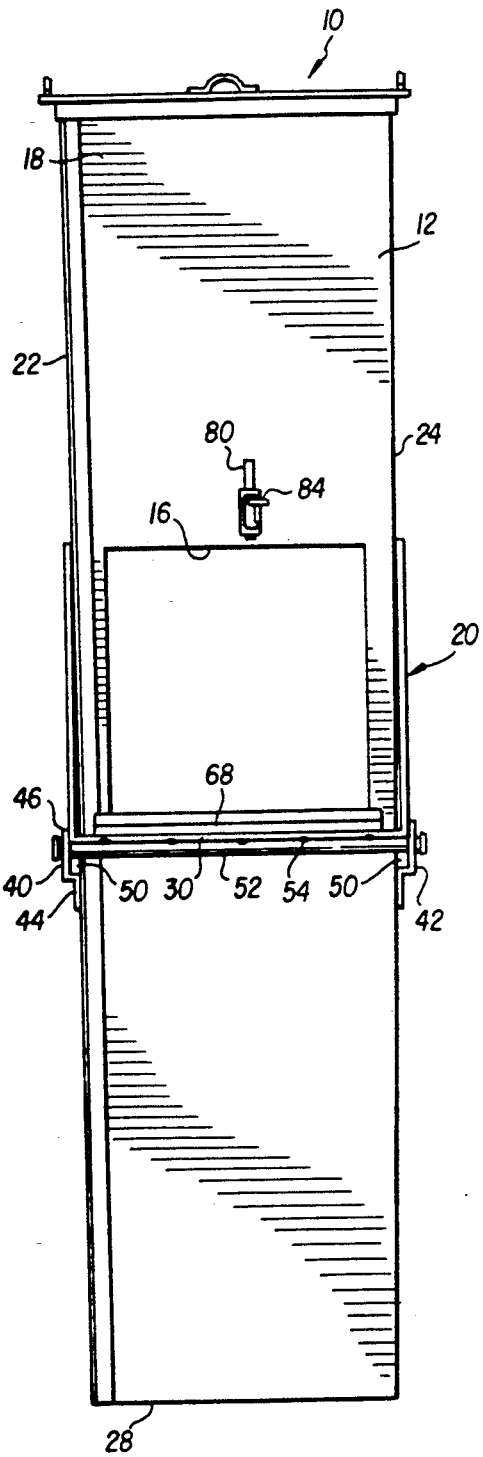
FIG. 2 is a front view of the gravity conveyor chute section of FIG. 1.

With regard to hingedly attaching the ledge 30 to the sidewall 12, first and second ledge-hinge brackets 40 and 42 are mounted to the left and right side panels 22 and 24 respectively. The first and second ledge-hinge brackets 40 and 42 are mirror images of one another, therefore, only one ledge-hinge bracket will be described. The ledge-hinge brackets have bottom and top plates 44 and 46 which are parallel to one another, but which are offset from one another by a bent portion 48. A section of the bottom plate 44 is welded to its respective sidewall with a portion of the ledge-hinge bracket extending beyond the front panel 18 as can be seen in the drawings. The top plate 46 is spaced from its respective side panel so as to form a slot 50 therebetween. A ledge-hinge pin, or shaft, 52 extends through holes in the top plates 46 of those portions extending beyond the front panel 18 and is rotatable in these holes. The ledge 30 is, in turn, welded at 54 to the ledge-hinge pin 52. This structure allows the ledge 30 to be rotated upwardly to a closed position against the front panel 18, closing the side opening 16 as is depicted in FIG. 5, or to a laterally-extending position, as is depicted in FIGS. 1 and 2, to form a ledge for the side opening 16.

Attached to the ledge 30, at the first and second side edges 32 and 34 thereof, are first and second side supports 56 and 58. These supports have rear edge portions 60 which, when the ledge 30 is in the laterally-extending position, extend beyond the first and second side edges 36 and 38 of the front panel 18 to be adjacent to the left and right side panels 22 and 24. In this position, ledge-support pins or bolts 62 can be extended through openings 64 in the first and second side supports 56 and 58 and through the left and right side panels 22 and 24 to support the ledge 30. Although not shown in the drawings, additional supports can be provided on the right and left side panels 22 and 24 to reinforce them at positions engaged by the bolts 62.

Hingedly mounted on a top surface 66 of the ledge 30 is a door 68. In this respect, a pipe hinge 70 has alternate adjacent sections 72a and 72b. The pipe sections 72a are welded to a lower end 74 of the door 68 while the other sections 72b are welded to the top surface 66 of the ledge 30. A door pin 76 passes through all of the pipe sections 72a and b to thereby allow the door 68 to be rotated relative to the ledge 30. If the ledge 30 is rotated to a closed position on the ledge-hinge pin 52, the door 68 will automatically also be in a closed position on the front panel 18 covering the side opening 16. However, if the ledge 30 is in a laterally-extending position, the door 68 can either be in a closed position, as shown in FIG. 1, or in a laterally-extending position as shown in bold lines in FIG. 4.

A bolt-locking assembly 78 is mounted on the front panel 18 above the opening 16 with a bolt 80 which can be moved in a cylinder 82 by means of a knob 84 either to a down, or locking, position as shown in FIG. 5 or to an up, or unlocking, position as shown in FIG. 4. Although not shown in the drawings, the bolt-locking assembly 78 can be locked in either position so that only one with a key can open it.

Looking now at operation of the gravity conveyor chute section of this invention, the section 10 is telescoped with other sections (not shown) to form a gravity conveyor chute beside a building with the opening 16 being at a floor level of the building. The bolt-locking assembly 78 is moved to an unlocking position and the ledge 30 is rotated downwardly to be in a laterally-extending position as shown in FIG. 1 for forming a ledge for the opening 16. In this position, the door 68 can be rotated downwardly about the door pin 76 to be relatively flush against the ledge, as shown in FIG. 4, to thereby form a portion of the ledge, or it can be rotated upwardly to a closed position, as shown in FIG. 1. The bolt-locking assembly 78 can be used for locking the door 68 in a closed position. When it is desired to transport the gravity conveyor chute section 10, the ledge 30 is rotated upwardly about the ledge-hinge pin 52 and locked in a closed position by the bolt-locking assembly 78. It should be understood that the bolt-locking assembly 78 can be used both for locking the door 68 alone and for locking the ledge 30 and the door 68 together. When the ledge 30 is rotated upwardly, the first and second side supports 56 and 58 slide along the left and right side panels 22 and 24 to be relatively flush therewith. When the door/ledge assembly 20 is in a closed position as depicted in dashed lines in FIG. 4, it is relatively flush against the front panel 18 and the left and right side panels 22 and 24. Thus, the gravity conveyor chute section 10 can be easily transported and stored without having unduly disruptive side protrusions which "catch" on other structures. It should be noted that when the first and second side supports 56 and 58 slide along the left and right side panels 22 and 24, they also rotate in the slots 50 of the first and second ledge-/hinge brackets 40 and 42.

The various parts of the gravity conveyor chute section 10 are made of steel, with the door pin 76 being a ⅜ inch rod and the ledge-hinge pin 52 being a 1⅛ inch shaft. The ledge 30 and its first and second side supports 58 and 60 are of 3/16 inch plate steel while the door 68 is ⅛ inch plate steel. Both the door 68 and the ledge 30 are approximately 36 inches long in one embodiment.

It will be appreciated by those of ordinary skill in the art that the gravity conveyor chute section of this invention can be used for a gravity conveyor chute with the door/ledge assembly 20 in the closed position because, when it is in the closed position it does not obstruct the bore 14. That is, if it is desired to use the gravity conveyor chute section 10 simply as a conveying section without a side opening, the door/ledge assembly 20 is locked in a closed position. Such a gravity conveyor chute section 10 with a closed door/ledge assembly can be placed on an angle to the vertical by positioning the door/ledge assembly 20 facing upwardly, thereby allowing a more streamlined back panel 86 to come in contact with materials conveyed by the section 10.

While the invention has been particularly shown and described with reference to a preferred embodiment, it will be understood by those skilled in the art that various changes in form and detail may be made therein without departing from the spirit and scope of the invention. For example, another type of locking assembly could be used rather than a bolt-locking assembly. Also, it might be possible to rotatively attach the door 68 directly to the front panel 18, rather than coupling it to the top surface 66 of the ledge 30.

The embodiments of the invention in which an exclusive property or privilege are claimed are defined as follows:

1. A gravity conveyor chute section of a type which can be engaged with other conveyor chute sections to form a gravity conveyor chute, the section comprising a sidewall having basically a tubular shape which guides items falling through a bore thereof, said section having an upstream end opening for receiving items dropped into said section from above and a downstream end opening for discharging said items passing through the bore of said section, at least one of said ends being selectively engagable with an adjacent section to form said conveyor chute to be longer than a single section whereby items serially fall through the bores of said thusly engaged sections, said section further defining a side opening through a panel of the sidewall thereof at a position intermediate said upstream and downstream ends through which items can be dropped into the bore of said section, said section including a door/ledge assembly mounted on said sidewall at said side opening, said door/ledge assembly comprising:

a ledge and a ledge-hinge means for hingedly attaching said ledge to said sidewall below said side opening for allowing said ledge to be selectively rotated to a laterally-extending position extending laterally away from said sidewall, thereby forming a ledge below said side opening, and to a covering position for covering said side opening, said ledge being wider than the sidewall with first and second side edges of said width of said panel of ledge extending beyond first and second side edges of said panel;

first and second side supports respectively attached to said first and second side edges of said ledge for extending to, and engaging said sidewall for providing support to said ledge when it is in the laterally-extending position, said first and second side supports being respectively positioned beyond said first and second side edges of said panel so that when said ledge is moved to the covering position said first and second side supports move along the outer surface of said sidewall beyond the respective first and second side edges of said panel; and a door and a door-hinge means for hingedly attaching said door to said chute section below said opening for allowing said door to be selectively rotated to said laterally-extending position with said ledge and to said closed position with or without said ledge;

whereby said ledge can be moved to said closed position without blocking said bore and can be moved to a laterally-extending position while allowing said door to be selectively opened and closed.

2. A gravity conveyor chute section as in claim 1, wherein said door-hinge means is mounted on said ledge.

3. A gravity conveyor chute section as in claim 2, further including a locking assembly mounted on said sidewall above said side opening for selectively locking said ledge and said door in a closed position and for only locking said door in a closed position when said ledge is in a laterally-extending position.

4. A gravity conveyor chute section as in claim 2, wherein said ledge-hinge means comprises brackets attached to side panels of said side wall with a ledge-hinge pin extending through openings in said brackets and being welded to a bottom surface of said ledge.

5. A gravity conveyor chute section as in claim 1, further including a locking assembly mounted on said sidewall above said side opening for selectively locking said ledge and said door in a closed position and for only locking said door in a closed position when said ledge is in a laterally-extending position.

6. A gravity conveyor chute section as in claim 1, wherein said ledge-hinge means comprises brackets attached to side panels of said side wall with a ledge-hinge pin extending through openings in said brackets and being welded to a bottom surface of said ledge.

7. A gravity conveyor chute section of a type which can be engaged with other conveyor chute sections to form a gravity conveyor chute, the section comprising a sidewall having basically a tubular shape which guide items falling through a bore thereof, said section having an upstream end opening for receiving items dropped into said section from above and a downstream end opening for discharging said items passing through the bore of said section, at least one of said ends being selectively engagable with an adjacent section to form said conveyor chute to be longer than a single section whereby items serially fall through the bores of said thusly engaged sections, said section further defining a side opening through a panel of the sidewall thereof at a position intermediate said upstream and downstream ends through which items can be dropped into the bore of said section, said section including a ledge assembly mounted on said sidewall at said side opening, said ledge assembly comprising:

a ledge and a ledge-hinge means for hingedly attaching said ledge to said sidewall below said side opening for allowing said ledge to be selectively rotated to a laterally-extending position extending laterally away from said sidewall, thereby forming a ledge below said side opening, and to a covering position for covering said side opening, said ledge being wider than the width of said panel of said sidewall with first and second side edges of said ledge extending beyond first and second side edges of said panel; and first and second side supports respectively attached to first and second side edges of said ledge for extending to, and engaging said sidewall and for providing support to said ledge when it is in the laterally-extending position, said first and second side supports being respectively positioned beyond said first and second side edges of said panel so that when said ledge is moved to the covering position said first and second side supports move along the outer surface of said sidewall beyond the respective first and second side edges of said panel;

whereby said ledge can be moved to said covering position without blocking said bore and can be moved to said laterally-extending position for forming a ledge to said side opening.

8. A gravity conveyor chute as in claim 7 wherein is further b 50905439.002 included a door and a door-hinge means for hingedly attaching said door to said chute section for allowing said door to be selectively rotated between positions for opening and closing said side opening when said ledge is in a laterally extending position.

9. A method of using a gravity chute comprising the steps of:

mounting a gravity chute on the side of a structure from which items are to be conveyed by said gravity conveyor chute, said gravity conveyor chute being constructed of sections of a type which can be engaged with one another to form the gravity conveyor chute, each section comprising a sidewall having a basically tubular shape which guides items falling through a bore thereof, each of said sections having an upstream end opening for receiving items dropped into said section from above and a downstream end opening for discharging said items passing through the bore of said section, at least one of said sections further defining a side opening through a panel of the sidewall at a position intermediate said upstream and downstream ends through which the items can be dropped into the bore of said at least one section, said at least one section including a ledge assembly mounted on said sidewall at said side opening, said ledge assembly comprising a ledge and a ledge-hinge means for hingedly attaching said ledge to rotate between a laterally-extending position extending laterally away from said sidewall, thereby forming a ledge below said side opening and a cover position for covering said side opening without obstructing the bore of said at least one section, said ledge assembly including a locking means for attaching said ledge to said sidewall of said at least one section when said ledge is in said laterally extending position whereby said ledge is locked in said laterally-extending position to serve as a fixed ledge when persons supported by said structure discard items through said side opening into said bore;

moving said ledge to said laterally extending position extending laterally away from said tubular sidewall to said structure and, using said locking means, attaching said ledge to said sidewalls so that said ledge serves as a fixed ledge whereby persons supported by said structure can discard items into the bore of said chute through said side opening;

detaching said locking means and moving said ledge to said covering position for covering said side opening without obstructing the bore of said section; and thereafter, dropping items into said chute from above said at least one section and allowing said items to fall through said at least one section without substantially contacting said ledge assembly thereof.

* * * * *